United States Patent [19]

Allen

[11] Patent Number: 6,049,507
[45] Date of Patent: Apr. 11, 2000

[54] METHOD AND APPARATUS FOR CORRECTING EFFECTS OF SHIP MOTION IN MARINE SEISMOLOGY MEASUREMENTS

[75] Inventor: Kenneth Paul Allen, Dallas, Tex.

[73] Assignee: Mobil Oil Corporation, Fairfax, Va.

[21] Appl. No.: 09/120,410

[22] Filed: Jul. 22, 1998

Related U.S. Application Data

[63] Continuation-in-part of application No. 08/941,463, Sep. 30, 1997.
[51] Int. Cl.⁷ ........................................... G01V 1/38
[52] U.S. Cl. ..................... 367/21; 367/46; 367/62
[58] Field of Search ..................... 367/15, 19, 21, 367/42, 49, 53, 46, 24, 57, 62; 364/421

[56] References Cited

U.S. PATENT DOCUMENTS

| | | | |
|---|---|---|---|
| 4,159,463 | 6/1979 | Silverman | 340/15.5 |
| 4,380,059 | 4/1983 | Ruehle | 367/46 |
| 4,809,235 | 2/1989 | Dragoset, Jr. | 367/21 |
| 5,134,590 | 7/1992 | Garotta | 367/38 |
| 5,325,436 | 6/1994 | Soli et al. | 381/68 |

OTHER PUBLICATIONS

Exploration Seismology, R.E. Sheriff and L.P. Geldart, 1995, 11 pages, Australia.

Simple Theory for Correction of Marine Vibroseis Phase Dispersion, Philip S. Schultz, Andrew W. Pieprzak, Graham R. Johnson and Leon Walker, pp. 660–662, US.

Marine vibrators and the Doppler effect, William H. Dragoset, pp. 1388–1398, Nov. 1988, Houston, Texas.

The effects of source and receiver motion on seismic data, Gary Hampson and Helmut Jakubowicz, Geophysical Prospecting, vol. 43, 1995, pp. 221–244.

*Primary Examiner*—Christine K. Oda
*Assistant Examiner*—Anthony Jolly
*Attorney, Agent, or Firm*—Malcolm D. Keen

[57] ABSTRACT

An apparatus and method for removing the distortion in marine seismic data resulting from the motion of the ship. The ship trails one or more seismic sources and receivers and moves forward at a known velocity. The seismic sources emit seismic waves that travel through the water and reflect off interfaces between rock formations below the ocean floor. The motion of the sources and receivers introduces distortion in the recorded seismic data that can be modeled using Doppler theory. The data preferably is corrected for source motion independently from the correction for receiver motion. The seismic data is first corrected for receiver motion and then for source motion. The technique for correcting for source motion includes correlating the receiver-corrected data with a reference sweep signal, performing an F-K transform, performing an inverse F-K transform on a selected subset of the F-K transformed data, and computing appropriate correction filters for the data resulting from the inverse F-K transform. This process is repeated for all subsets of F-K transformed data and the resulting filtered data are summed together.

22 Claims, 9 Drawing Sheets

METHOD AND APPARATUS FOR CORRECTING EFFECTS OF SHIP MOTION IN MARINE SEISMOLOGY MEASUREMENTS

CROSS-REFERENCE TO RELATED APPLICATIONS

This application is a continuation in part of prior application Ser. No. 08/941,463, filed Sep. 30, 1997.

STATEMENT REGARDING FEDERALLY SPONSORED RESEARCH OR DEVELOPMENT

Not applicable.

BACKGROUND OF THE INVENTION

1. Field of the Invention

The present invention relates generally to marine seismology, in which a moving ship generates seismic waves and detects reflections. Still more particularly, the invention relates to the correction of the detected seismic waves for the motion of the ship.

2. Background of the Invention

The field of seismology focuses on the use of artificially generated elastic waves to locate mineral deposits such as hydrocarbons, ores, water, and geothermal reservoirs. Seismology also is used for archaelogical purposes and to obtain geological information for engineering. Exploration seismology provides data that, when used in conjunction with other available geophysical, borehole, and geological data can provide information about the structure and distribution of rock types and their contents.

Most oil companies rely on seismic interpretation for selecting the sites in which to invest in drilling exploratory oil wells. Despite the fact that seismic data is used to map geological structures rather than finding petroleum directly, the gathering of seismic data has become a vital part of selecting the site of an exploratory and development well. Experience has shown that the use of seismic data greatly improves the likelihood of a successful venture.

Figure 1:
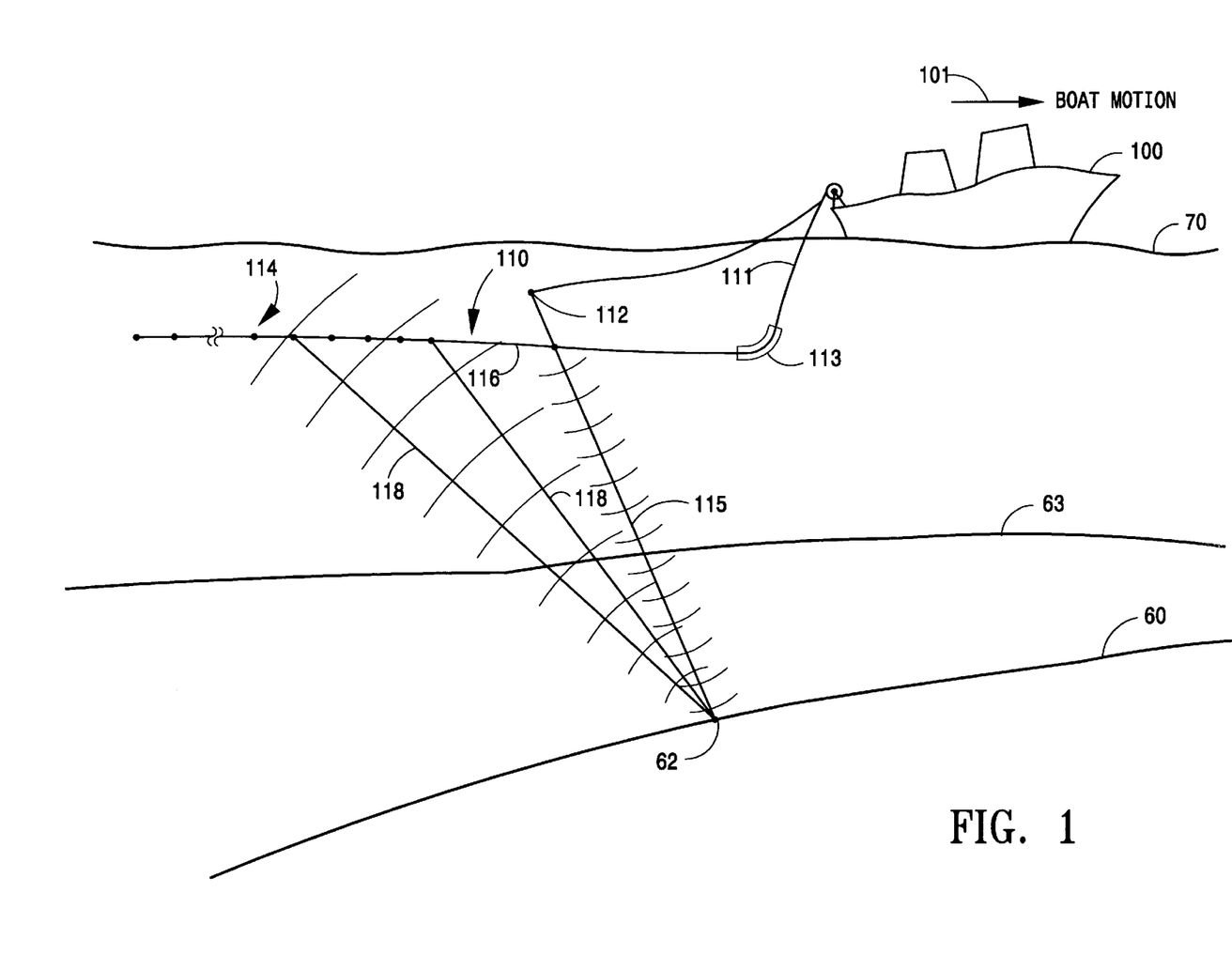
FIG. 1 shows a ship for making seismic measurements with a towed streamer array including a seismic source and multiple receivers.

Seismic data acquisition is routinely performed both on land and at sea. At sea, seismic ships deploy a streamer or cable behind the ship as the ship moves forward. The streamer includes multiple receivers in a configuration generally as shown in FIG. 1. Streamer 110 trails behind ship 100 which moves in the direction of the arrow 101. As shown in FIG. 1, source 112 is also towed behind ship 100. Source 112 and receivers 114 typically deploy below the surface of the ocean 70. Streamer 110 also includes electrical or fiber-optic cabling for interconnecting receivers 114, and the seismic equipment on ship 100. Streamers are usually constructed in sections 25 to 100 meters in length and include groups of up to 35 or more uniformly spaced receivers. The streamers may be several miles long and often a seismic ship trails multiple streamers to increase the amount of seismic data collected. Data is digitized near the receivers 114 and is transmitted to the ship 100 through the cabling at rates of 7 (or more) million bits of data per second. Processing equipment aboard the ship controls the operation of the trailing source and receivers and processes the acquired data.

Seismic techniques estimate the distance between the ocean surface 70 and subsurface structures, such as structure 60 which lies below the ocean floor 63. By estimating the distance to a subsurface structure, the geometry or topography of the structure can be determined. Certain topographical features are indicative of oil and/or gas reservoirs.

To determine the distance to subsurface structure 60, source 112 emits seismic waves 115 which reflect off subsurface structure 60. The reflected waves are sensed by receivers 114. By determining the length of time that the seismic waves 115 took to travel from source 112 to subsurface structure 60 to receivers 114, an estimate of the distance to subsurface structure 60 can be obtained.

The receivers used in marine seismology are commonly referred to as hydrophones, or marine pressure phones, and are usually constructed using a piezoelectric transducer. Synthetic piezoelectric materials, such as barium zirconate, barium titanate, or lead mataniobate, are generally used. A sheet of piezoelectric material develops a voltage difference between opposite faces when subjected to mechanical bending. Thin electroplating on these surfaces allows an electrical connection to be made to the device so that this voltage can be measured. The voltage is proportional to the amount of mechanical bending or pressure change experienced by the receiver as resulting from seismic energy propagating through the water. Various types of hydrophones are available such as disk hydrophones and cylindrical hyrdophones.

Two types of seismic sources are used to generate seismic waves for the seismic measurements. The first source type comprises an impulsive source which generates a high energy, short time duration impulse. The time between emitting the impulse from the source and detecting the reflected impulse by a receiver is used to determine the distance to the subsurface structure under investigation. The impulsive source and the associated data acquisition and processing system are relatively simple. However, the magnitude of energy required by seismic techniques using impulsive sources may, in some situations, be harmful to marine life in the immediate vicinity of source 112.

The environmental concerns associated with impulsive sources has lead to the use of another type of seismic source which generates a lower magnitude, vibratory energy. The measurement technique which uses such a source is referred to as the marine vibratory seismic ("MVS") technique. Rather than imparting a high magnitude pressure pulse into the ocean in a very short time period, vibratory sources emit lower amplitude pressure waves over a time period typically between 5 and 7 seconds, but longer time periods are also possible. Further, the frequency of the vibrating source varies from about 5 to 150 Hz, although the specific low and high frequencies differ from system to system. The frequency of the source may vary linearly with respect to time or non-linearly. The frequency variations are commonly called a "frequency sweep". The frequency sweep is thus between 5 and 150 Hz and 5 to 7 seconds in duration. The magnitude of the seismic wave oscillations may vary or remain at a constant amplitude. The amplitude of the oscillations, however, are much lower than the magnitude of impulsive sources and thus, there are fewer environmental concerns with the MVS seismic technique.

Seismic ships must move forward while seismic measurements are being recorded for many reasons. Referring still to FIG. 1, the hydrophones 114, connecting wires and stress members provided on the streamers are placed inside a neoprene tube (not shown in FIG. 1) 2.5–5 inches in diameter. The tube is then filled with sufficient lighter-than-water liquid to make the streamer neutrally buoyant. A lead-in section 111 of the streamer 110 approximately 300 meters long and a number stretch of sections approximately 50 meters long trail between the ship's stern and the streamer section 116 in which the receivers 114 are included. A diverter 113 pulls the streamer section 116 out to an appropriate operating width. Depth controllers (not shown)

are fastened to the streamer at various places along its length. These devices sense the hydrostatic pressure and tilt bird wings so that the flow of water over them raises or lowers the streamer to the desired depth. The depth that the controllers seek to maintain can be controlled by a signal sent through the streamer cabling and thus the depth can be changed as desired. For the streamer's depth control system to function effectively, the ship 100 must travel forward at a speed through the water of approximately four knots.

Second, streamer 110 usually is a flexible cable and thus the ship must move forward to maintain a desired fixed separation between the sources and streamers, and between the streamers themselves. The spacing between sources and streamers is important in the marine seismology and must not vary while seismic measurement are made.

Third, seismic ships often deploy multiple streamers using diverters that allow a fixed separation to be maintained between streamers. These diverters force the streamers laterally as the boat moves forward. Without the barvanes, the streamers may become entangled. The relative velocity of the water around the diverters and the angle of attack determine the amount of separation between streamers.

Fourth, seismic ships must cover as much ocean surface as possible each day because of the cost of operating the ship. For these reasons and others, seismic ships must move forward while taking measurements and the forward speed must be reasonably constant. Typical ship speed is approximately 2–3 meters per second. Because the streamer is deployed behind the ship, the source and receivers also move at approximately 2.5 meters per second.

Marine seismic measurements can also be made using a technique called "on-bottom cable" (OBC) in which a ship lays one or more cables containing hydrophones and geophones on the ocean floor. This ship remains stationary and records data while collecting seismic data. The second ship containing sources moves parallel, or at some other angle, to the cables. In the OBC technique, the receivers do not move, but the sources are moving and thus, the acquired data is distorted. Further, in special circumstances, some of the receivers can be on land. Although OBC is generally more expensive than towed marine seismic measurements, OBC is necessary if land obstructions, such as an island, are located where the cables are to be layed.

Although ship motion is necessary as described above, the motion distorts or "smears" the acquired seismic data. Broadly, smearing results from the fact that the ship, and thus the sources and receivers, move while data collection takes place. It is generally recognized that the smearing effect of ship motion on seismic data results from two analytically separate phenomena—source motion and receiver motion. Although the receivers and source are pulled behind the ship and thus move at the same speed as the ship, the effect of source motion on the data is usually analyzed independently from the effect of receiver motion. Source motion is less of a concern than receiver motion in impulsive source-based seismic systems because the source moves a negligible amount during the brief impulse emitted by the source. Data smearing in a MVS system includes significant contributions from both receiver and source motion. Thus, the MVS-acquired data should be corrected for both receiver and source motion.

The high costs associated with operating a seismic ship require that the methods and procedures used be efficient. It is thus desirable to maximize data collection in as short a time as possible. Because of the length of the frequency sweep (typically 5 seconds or more), MVS sources are typically activated every 10 to 20 seconds. Because of the ship's speed (2–3 meters per second), a MVS source must be activated no sooner than every 12.5 to 75 meters. Although more data in one location could be acquired if the ship were to travel at a slower speed, streamer control would be lost and less ocean surface would be covered each day, thereby increasing the cost required to make seismic measurements of a desired section of the subsurface.

At least one attempt has been made to correct for receiver and source motion for MVS recorded data. In an article entitled "The Effects of Source and Receiver Motion on Seismic Data," by Hampson and Jakubowicz, Geophysical Prospecting, 1995, p. 221–244, a method for correcting for receiver and source motion is disclosed. Although the method of Hampson and Jakubowicz has theoretical merit, the method is impractical for use with conventional marine seismic systems as it requires the MVS source to be activated with a temporal and spatial spacing that is impractical. It is well known that for a wave traveling with a velocity V through a medium such as water and with a frequency of F (i.e., the number of complete cycles of the waveform per second), the velocity V is related to the frequency F by the length of the wave, referred to as the wavelength ($\lambda$). The relationship is:

$$V = F \cdot \lambda \qquad (1)$$

Thus, the wavelength $\lambda$ is V/F. In water seismic waves propagate with a known velocity of approximately 1500 meters per second (approximately 3325 miles per hour). If the highest frequency in a sweep is assumed to be 60 cycles per second (or 60 "Hz"), the wavelength of such a seismic wave is 25 meters (1500/60). To avoid a certain type of data distortion known as "aliasing", the source must be activated at a spacing of at least one half of the wavelength. Thus, for Hampson and Jakubowicz's method to work the vibratory sources must be activated at least every 12.5 meters, and preferably sooner. To activate a source at such narrow spacings, the ship must travel much slower than its preferred 2–3 meters per second.

It would be advantageous to provide a practical seismic system for use in marine applications that can correct the data for the motion of the ship without the deficiency inherent in the Hampson and Jakubowicz method. Such a system preferably would correct for both receiver and source motion and do so in a cost effective manner. Despite the apparent advantages, to date all attempts of developing such a system have failed.

BRIEF SUMMARY OF THE INVENTION

The problems outlined above are in large part solved by the seismic measurement and processing system of the present invention. The seismic measurement and processing system disclosed herein removes the distortion in marine seismic data resulting from the motion of the ship. According to the invention, the ship tows behind it one or more seismic sources and streamers as it moves forward at an approximately constant velocity. The seismic sources emit seismic waves that travel through the water and reflect off interfaces between rock formations at and below the ocean floor. The motion of the sources and receivers introduce distortion in the recorded seismic data that can be modeled using Doppler theory. The data preferably is corrected for source motion independently from the correction for receiver motion. According to the preferred embodiment, the seismic data is corrected first for receiver motion using any of a variety of techniques and then for source motion.

The technique for correcting for source motion includes correlating the receiver-corrected data with a reference sweep signal, performing a transform (such as an F-K transform), performing an inverse transform (such as an inverse F-K transform) on a selected subset of the transformed data, and computing appropriate correction filters for the data resulting from the inverse F-K transform. The inverse transformed data corresponds to seismic energy that travels upward from subsurface structures at a particular angle referred to as a dip angle. Appropriate Doppler correction filters are computed for each set of inverse transformed data and the process is repeated for all subsets of F-K transformed data. The Doppler filters are applied to the seismic data, and the filtered data are summed together.

These and other advantages of the present invention will be apparent to one skilled in the art upon reading the following detail description of the invention.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENTS

The present invention corrects seismic data collected by a marine seismic system for the motion of the towed seismic receivers and sources. For simplicity, the technique will be described with reference to a "diffractor" (also called a "scatterer") which is a reflecting point located at the physical interface between contiguous subsurface formations. Because a subsurface interface is comprised of many point diffractors, the entire interface can be mapped by merely superimposing the results from each point diffractor.

Figure 2:
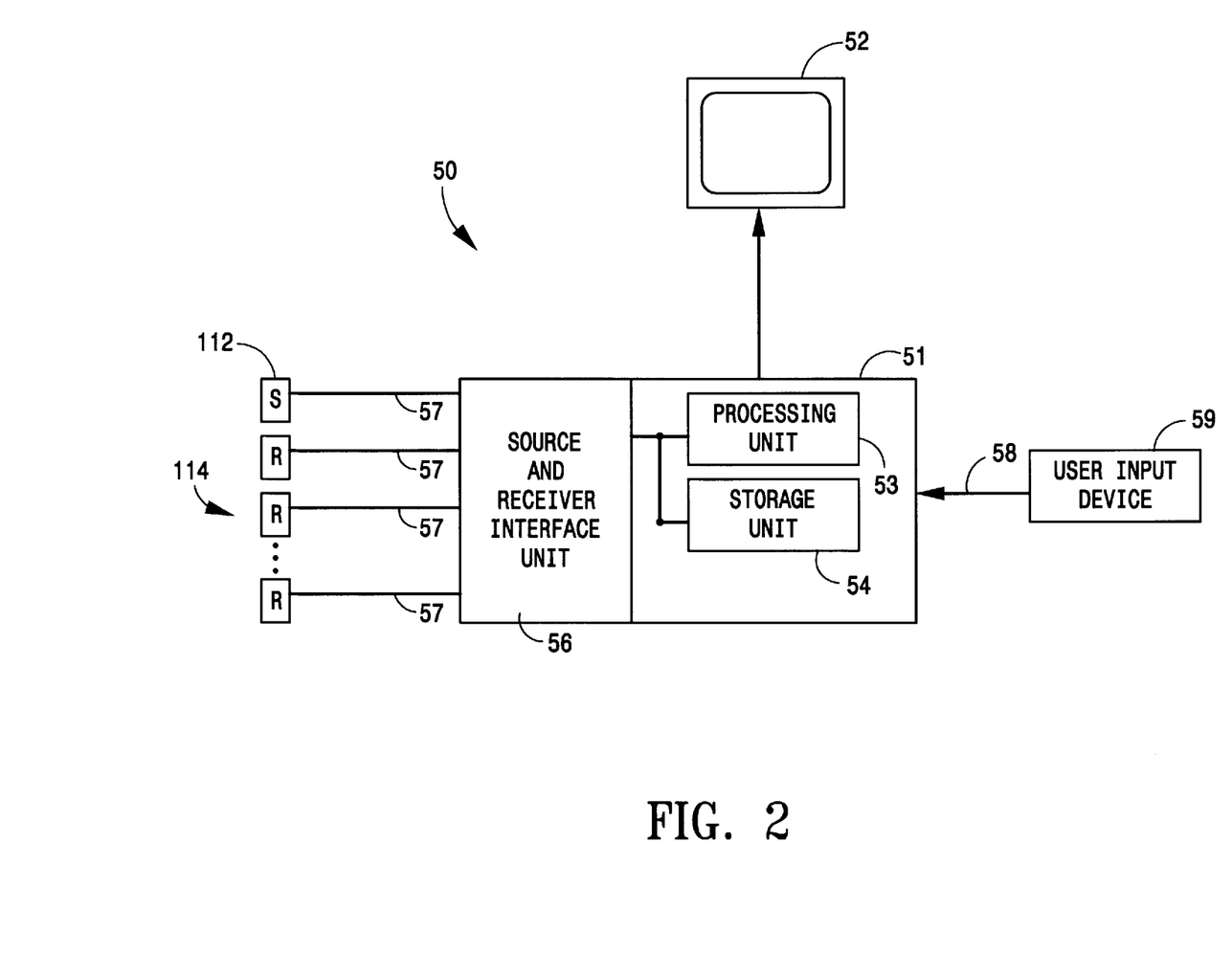
FIG. 2 shows a seismic measurement system in accordance with the preferred embodiment of the present invention.

Referring now to FIG. 2, a seismic system 50 constructed in accordance with the preferred embodiment generally includes a seismic measurement and processing system 51, a user input device 59 (preferably a keyboard, buttons, switches, and control knobs), a display device 52, one or more seismic sources 112, and one or more cables (also called streamers) of seismic receivers 114. The collection of all receivers for a shot is also referred to as a "shot gather." The seismic measurement and processing system 51 includes a processing unit 53 coupled to a data storage unit 54, and source and receiver interface unit 56. It should be recognized that the seismic measurement system 50 may include other components not shown in FIG. 2. The user input device 59 allows a user to input commands and configuration information into the system 50. The display device 52 provides visual representations of data, configuration information, and status information to the user. The source and receivers preferably couple to the seismic measurement system via fiber-optic cables 57. The source 112 includes any suitable seismic source such as MVS sources and impulsive sources. Receivers 114 includes suitable hydrophone receivers including piezoelectric-based devices or any other suitable type of seismic receiver.

The processing unit preferably controls the operation of the seismic measurement system 50, storing data in storage unit 54 (which preferably is a magnetic tape, a hard disk. or CD ROM drive), and controlling the operation of the source 112 and receivers 114. Seismic signals detected by the receivers are transmitted to the seismic measurement system, processed by processing unit 52 and stored in storage unit 54.

Figure 3:
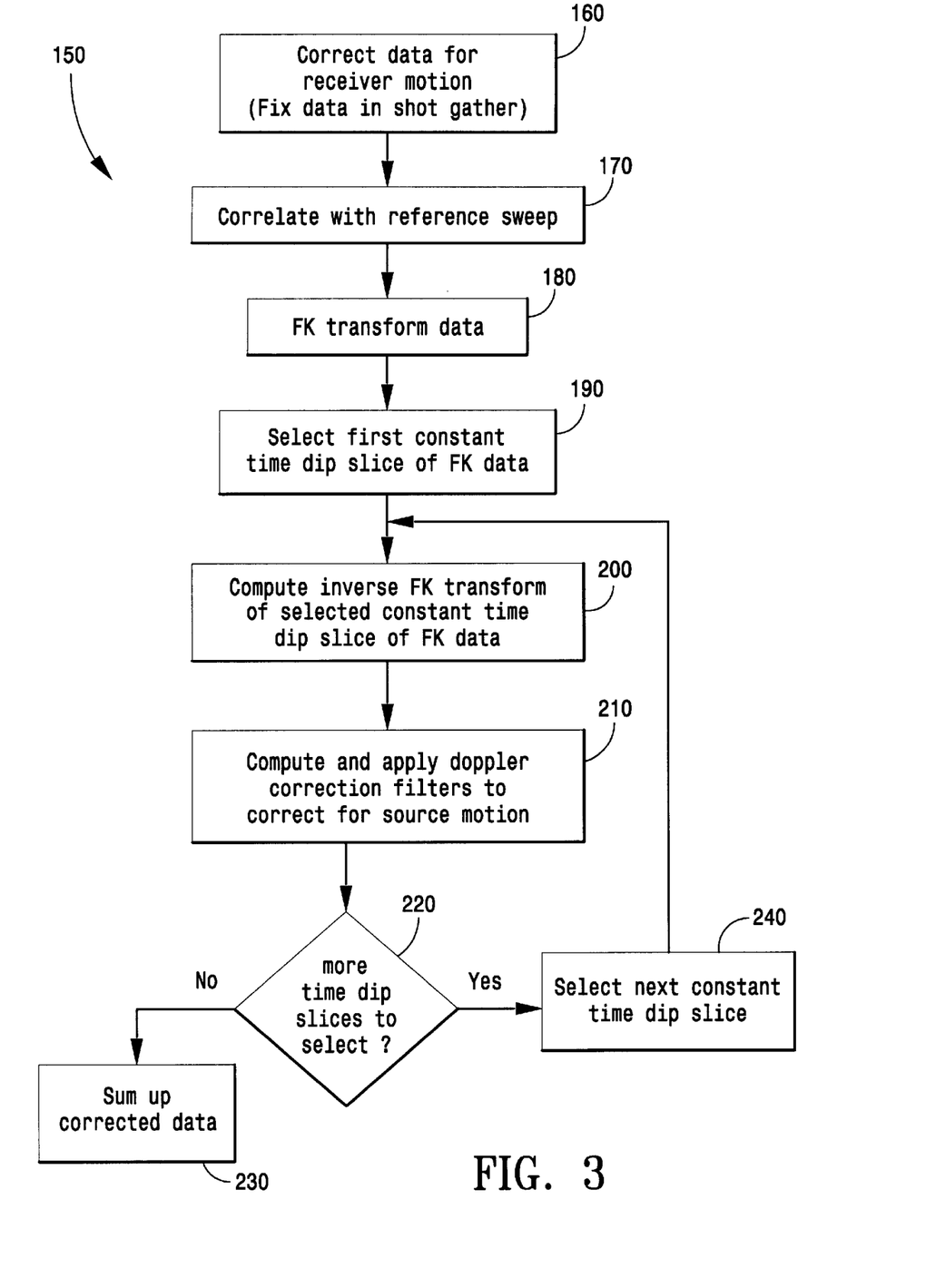
FIG. 3 shows the preferred method of correcting seismic data for the distortion caused by motion of the source and receivers.

Referring now to FIGS. 2 and 3, and explained in more detail in the discussion that follows, the seismic measurement and processing system 51 preferably corrects the recorded seismic data for the motion of the receivers 114 and the source 112 according to the methodology illustrated in flow chart 150. Alternatively, the seismic data can be stored on magnetic tape or disk and transferred to another computer system for analysis according to the teachings of the preferred embodiment at a location remote from the seismic ship. The preferred data correction method corrects first for the effect of receiver motion in step 160, and then corrects the data for the effect of source motion in steps 170–240. Each of these steps is explained below.

Correction for Receiver Motion (step 160)

Figure 4:
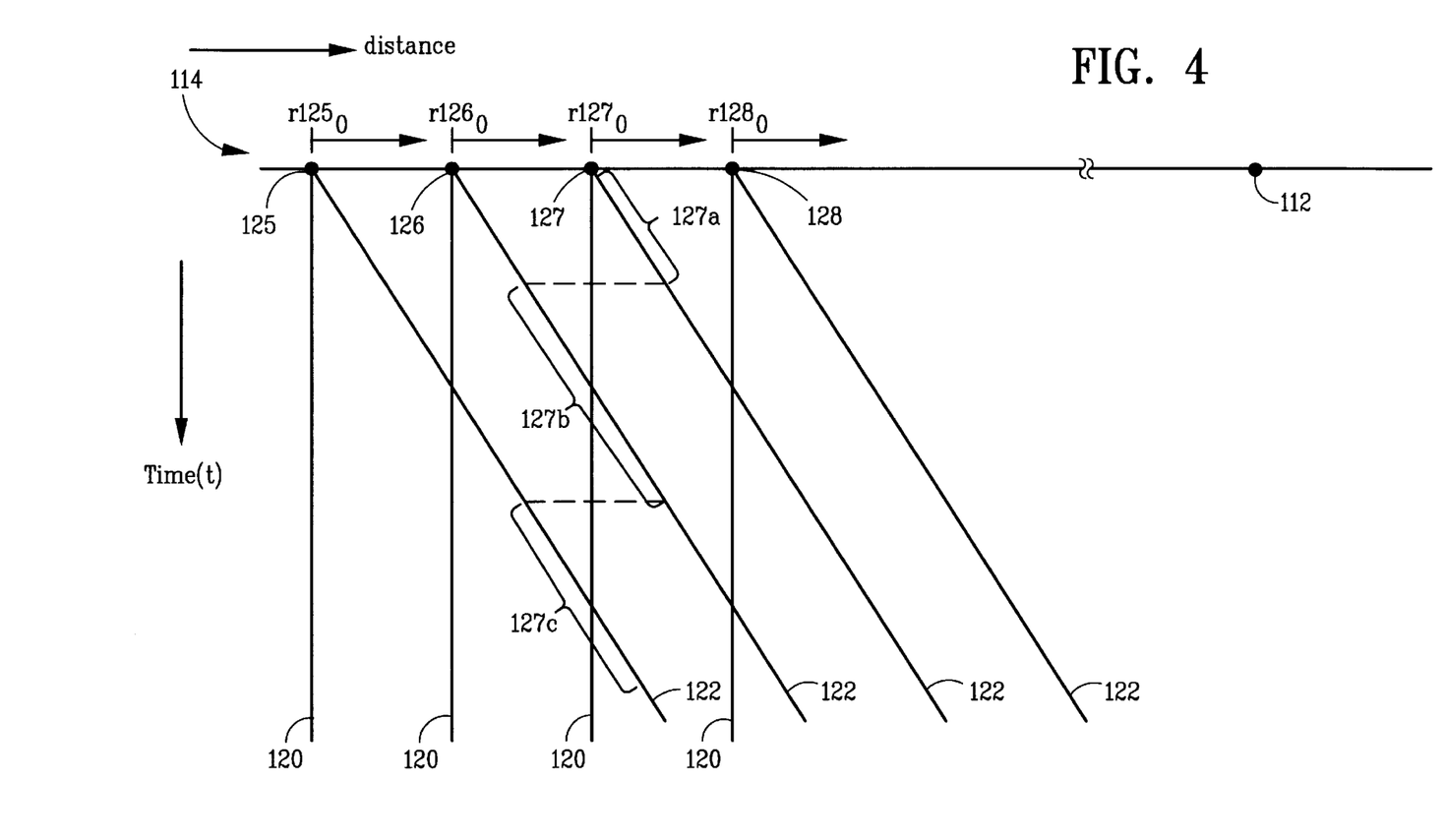
FIG. 4 shows exemplary pressure data from multiple receivers and the distorting effect of receiver motion on the data.

Referring now to FIG. 4, a shot gather 114 of receivers 125, 126, 127, 128 is shown with a pressure signal 120 recorded by each receiver. The pressure signals 120 are referred to collectively as a "shot record." Time is represented along the vertical axis and distance is represented across the horizontal axis. An exemplary trace is shown for one receiver 125 and, for simplicity, a straight line is used to represent the remaining trace records.

If the receivers did not move while recording the shot records, the traces 120 would be recorded at a fixed location and therefore would be a function only of time, and not space. Because the receivers are towed behind a moving ship (assumed to be moving to the right in FIG. 4), each shot record is recorded as a function, not only with respect to time, but also space, as indicated by traces 122 for each receiver. Traces 122 represent traces 120 as the receiver is pulled behind the ship. Thus, each data point on the shot records 122 represents the seismic pressure signals sensed by the receiver at a particular point in time and space.

Referring still to FIG. 4, each receiver is assumed to be located at position $r_0$ when the shot record begins. Thus, receiver 125 begins at location $r125_0$. Receiver 126 begins at location r126$_0$, receiver 127 at location r127$_0$, and receiver 128 at location r128$_0$. The distance between the initial location r$_0$ and the ending position is a function of the speed of the receivers. It is assumed for purposes of this discussion that the speed of the receivers, as well as the speed of the sources, is the same as the speed of the ship, although in theory slight differences in the speeds may exist due to such factors as the elasticity of the streamer 110.

Shot records 122 are represented in FIG. 4 as straight diagonal lines. The lines (representing pressure waveforms) are straight because the receiver speed is assumed to be constant. If the receiver speed is u$_r$, then the position of each receiver at any time t during a shot record is r$_0$+u$_r$t. The linear slanting of the shot records 122 is equivalent to a time-variant spatial shift. If p(s,u$_s$,S(t),r,u$_r$,t) represents the magnitude (pressure) p of the shot record as a function of source location s, source speed u$_s$, seismic signal S(t) produced by the source, receiver location r, receiver speed u$_r$, and time t, then time variant spatial shift can be mathematically modeled as the convolution of p(s,u$_s$,S(t),r,u$_r$,t) with a "Dirac" delta function (also referred to as a "unit impulse"):

$$p(s,u_s,S(t),r=r_0+u_r t,u_r,t)=p(s,u_s,S(t),r=r_0,u_r,t)*\delta(r_0+u_r t) \quad (2)$$

where the * operator denotes convolution and δ denotes a delta function. The convolution of two functions (a function represents a series of values at various points in time or space) is a known mathematical operation which involves replacing each element of one function with an output function scaled according to the magnitude of the input element, and then superimposing the output values. For a more detailed explanation of convolution, reference can be made to "Exploration Seismology," by Sheriff and Geldart, published by the Press Syndicate of the University of Cambridge, 1995, p. 279–81.

The spatial shift represented by δ(r$_0$+u$_r$t) in equation (2) can be removed by convolving the result in equation (2) with a spatial shift in the opposite direction. The correction for receiver motion is therefore:

$$p(s,u_s,S(t),r_0,0,t)=p(s,u_s,S(t),r=r_0+u_r t,u_r,t)*\delta(r_0-u_r t) \quad (3)$$

In equation (3), convolution of the spatially shifted shot record with the delta function δ(r$_0$–u$_r$t) results in a shot record had the receiver been stationary (u$_r$=0) at position r$_0$. Thus, the effect of receiver motion on the shot record is neutralized by convolving the shot record with a delta function representing a spatial shift. It should be recognized that the foregoing analysis involves functions and mathematical operations that occur as functions of time and space (the so called time and space domains).

Other ways to correct the shot records for receiver motion are available. For example, the correction provided in equation (3) can also be represented in the frequency domain in which all functions vary with frequency, not time. Functions can be converted from their time and space domain representations to the frequency domain using a mathematical operation called a Fourier transform. The frequencies involved with such Fourier transforms include temporal and spatial frequencies. The Fourier transform of the delta function, δ(r$_0$–u$_r$t), is $e^{-i2\pi k u_r t}$ where i represents the imaginary number (the square root of –1), k represents the spatial frequency (also referred to as the wavenumber) and π is a known constant. It is well known that convolution in the time and space domains is equivalent to multiplication in the frequency domain. Thus, the spatial shift introduced in equation (3) to counterbalance the spatial shift caused by the receiver motion can be represented in the frequency domain as the product of the Fourier transforms of the shot record and $e^{-i2\pi k u_r t}$.

$$P(f,k) \cdot e^{-i2\pi K u_r t} \quad (4)$$

Where P(f, k) is the Fourier transform of the shot record and is a function of temporal frequency f and spatial frequency k. The symbol "·" denotes multiplication.

Figure 5:
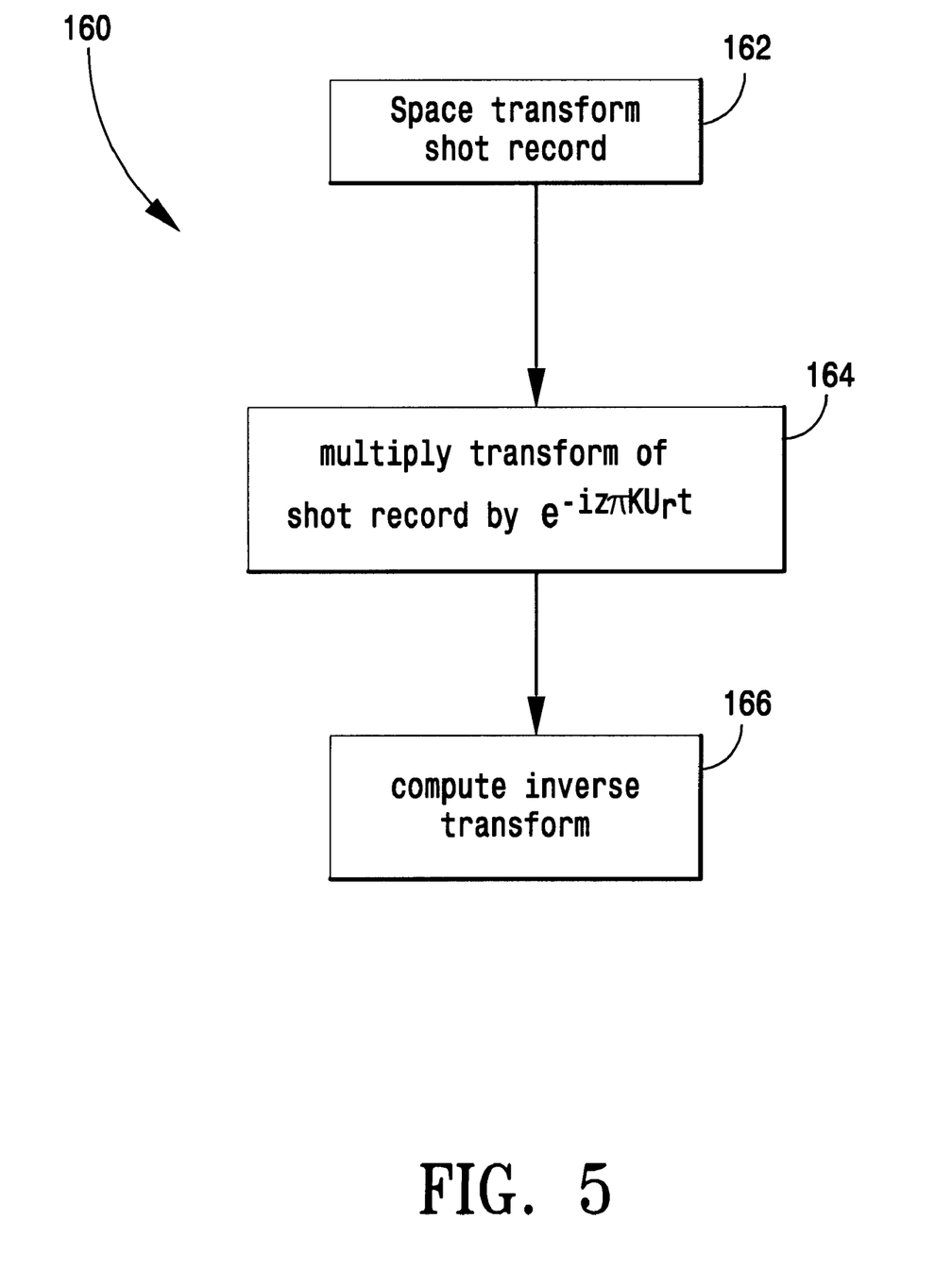
FIG. 5 shows a preferred method for correcting seismic data for the distortion caused by receiver motion.

Referring now to FIGS. 2, 3 and 5, the seismic measurement system 50 removes the effect of receiver motion using equation (4) by first computing the Fourier transform of the shot records in step 162. The seismic measurement and processing system 51 computes the Fourier transform using any one of a variety of known techniques such as the Fast Fourier Transform. It should be recognized that any suitable transform, such as Laplace, radon, and τ-p transforms, can be used as well. In step 164, the seismic measurement and processing system 51 multiplies the Fourier transform of the shot records by the Fourier transform of the delta function of equation (3) represented as $e^{-i2\pi K u_r t}$. Finally, in step 166, the product from step 164 is converted back into the time and space domain through an operation referred to as the inverse Fourier transform which also is a known technique.

Another method for correcting for receiver motion is described with reference to FIG. 4 to correct the shot record for the motion of the receivers. This method will be described with reference to one such receiver, such as receiver 127. In this method, the seismic measurement and processing system 51 selects data from a receiver while the receiver is near the location at which the shot record is to be fixed. To fix the shot record for location r127$_0$, for example, the seismic measurement system selects the portion of shot records from receivers 127, 126, and 125 when each receiver is near location r127$_0$. The portion of the shot records to be selected by seismic measurement and processing system 51 is identified by reference numbers 127a, 127b, and 127c. Thus, seismic measurement system selects the initial portion 127a of the shot record from receiver 127 until that receiver moves a distance approximately equal to one-half the group interval away from location r127$_0$. At that point, seismic measurement and processing system 51 selects the middle portion 127b of the shot record from receiver 126 until that receiver also moves one-half the group interval away from location r127$_0$. Finally, the last portion 127c of the shot record from receiver 125 is selected by the system 51. The technique described above for correction of receiver motion is not needed if the OBC seismic technique is used.

The methods described above are exemplary only of the methods for correcting for receiver motion and the invention is not intended to be limited to any particular method. Preferably following receiver motion correction, the seismic measurement and processing system 51 corrects the data for the source motion.

Correction for Source Motion (steps 170–240)

Referring to FIG. 3, in the preferred method 150 for correction of the data for source motion, the seismic measurement and processing system 51 correlates the data (now corrected for receiver motion per step 160) with the MVS reference sweep signal. The MVS reference sweep signal can be any sweep signal desired and may include linear frequency sweeps (frequency changes at a constant rate during the sweep) or non-linear frequency sweeps (frequency changes at a varying rate during the sweep). As explained below, the correlation step 170 is necessary in a MVS system to compress the relatively long sweep to a short duration event.

The earth can be thought of as a filter of seismic energy. That is, if seismic energy is input into the earth, a receiver positioned on the surface of the earth will receive seismic energy whose character has been altered by the earth. The various factors that modify the seismic wave as it passes through the earth include:

(a) the zone near the source where the stresses and absorption of energy often are extreme;

(b) the response of the diffractors comprising the subsurface interfaces (the signal that seismic work is intended to find);

(c) the near-surface zone, which has a disproportionate effect in modifying the wave; and (d) additional modifying effects because of absorption, wave conversion, multiples, and diffractions, and the like.

In practice, the receivers record not only primary seismic reflections, but also multiples, diffractions, scattered waves, reflected refractions, surface waves, and the like, all overlapping in time.

Generally, a filter is a system that produces an output signal for a given input signal. The output signal can be calculated if the impulse response for the filter is known. The impulse response is the output signal produced by the filter for a given impulse input signal. The output signal is simply the input signal convolved with the impulse response of the filter.

The seismic signal detected by the receivers represents the input reference signal influenced by the factors described above. Seismic data (or "seismograms") is useful to determine the location of oil and gas reservoirs when the data represents the input reference signal acted upon only by the diffractors comprising the subsurface interfaces, as contrasted with a reference input signal that is also influenced by the above-described signal altering factors. The effect that the diffractors have on the seismic waves propagating through the earth is referred to as the impulse response of the earth. Because of the additional signal altering factors described above, the seismic signal received by the receivers in a MVS recording bears little resemblance to the impulse response of the earth. Seismic work is intended to determine the impulse response of the earth, and thereby remove the influences on the data that are not of interest to seismologists.

To remove the long sweep duration from the recorded data, the seismic measurement system 50 preferably correlates the recorded data with the reference sweep signal. The correlation of two data sets is a known mathematical operation in which one data set is displaced by varying amounts relative to the other data set and corresponding values of the two sets are multiplied together and the products summed to give the value of the correlation. In step 170, shown in FIG. 3, the data from step 160 that has been corrected for receiver motion is correlated with the reference sweep signal.

In step 180, an F-K transform (F refers to temporal frequency and K refers to spatial frequency or wavenumber) is performed on the correlated data from step 170, although other suitable transforms, such as the Laplace transform, radon transform and τ-p transform, can also be used. The F-K transform is a double Fourier transform in which a signal that is a function of time, t, and space, x, is transformed to a signal that is a function of frequency, f, and wavenumber, k. The transformed signal can be plotted on a plot referred to as an F-K plot, such as that shown in FIG. 6. Converting a function from the time and space domain into the frequency and wavenumber domain is referred to as a forward F-K transform. By analogy, converting a function from the frequency and wavenumber domain back into the time and space domain is referred to as an inverse F-K transform. The forward F-K transform is represented mathematically with a double integral as:

$$P(k, f) = \int \int p(x,t) e^{-i2\pi(kx+ft)} dx dt \quad (5)$$

where P(k,f) is the F-K transform of p(x,t). The inverse F-K transform (performed in step 200) is represented as:

$$p(x,t) = \int \int P(k,f) e^{-i2\pi(kx+ft)} dk df \quad (6)$$

Figure 6:
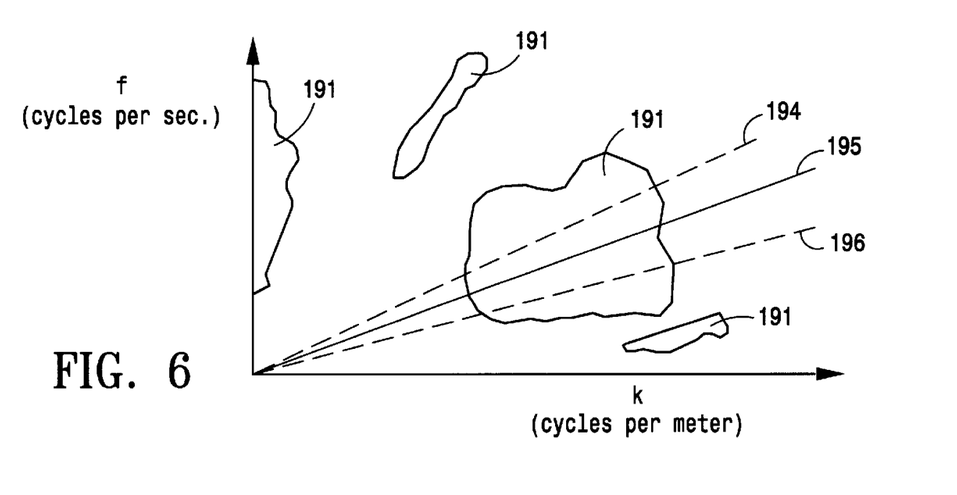
FIG. 6 shows an exemplary plot of seismic data in the F-K domain.

Referring again to FIG. 3, in step 190, the seismic measurement system selects a constant time dip slice of data (described below) from the F-K plot. This step is best understood with reference to FIGS. 6, 7, and 8. FIG. 6 shows an F-K plot of a transformed shot record from FIG. 7. Frequency measured in cycles per second or "Hertz" (Hz) is represented on the vertical axis and wavenumber measured in cycles per meter is represented on the horizontal axis. The F-K transformed data is represented by portions 191 in the F-K plot.

Figure 7:
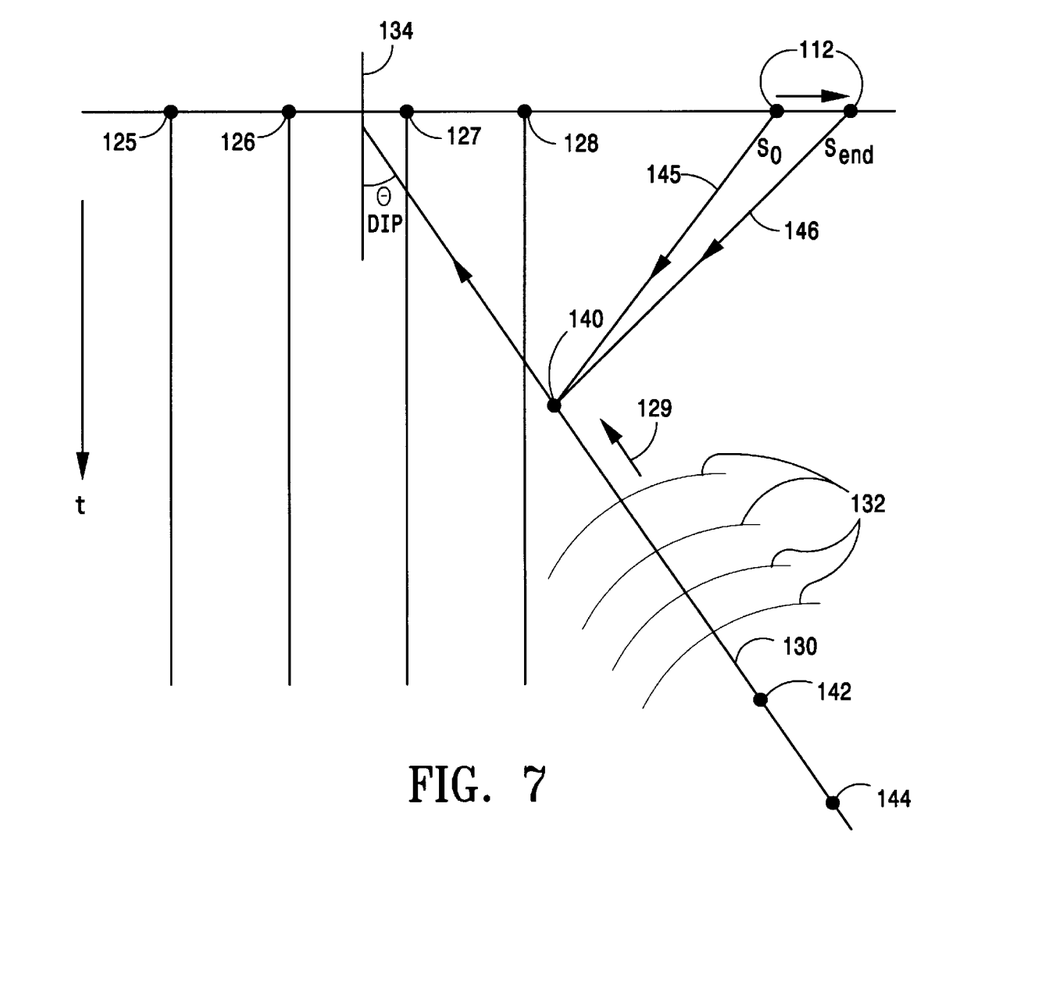
FIG. 7 shows exemplary shot records of multiple receivers in which only data at a constant dip angle is included in the shot records.

Every straight line, such as lines 194, 195, 196, beginning from the origin of the F-K axes and extending outward represents seismic data with a particular apparent velocity. Further, the slope of each such straight line is equal to an apparent velocity. Referring to FIG. 7, receivers 125, 126, 127, 128 are shown with a seismic wave 132 propagating through the earth (including water) in the direction of arrow 129. Line 130 represents the direction of propagation of seismic wave 132 and forms an angle with vertical line 134. That angle is referred to as the angle of approach, apparent dip angle, or simply dip angle and is denoted in FIGS. 7 and 8 as $\theta_{DIP}$. Line 130 thus is referred to as the dip line or line of approach for purposes of this application.

Figure 8:
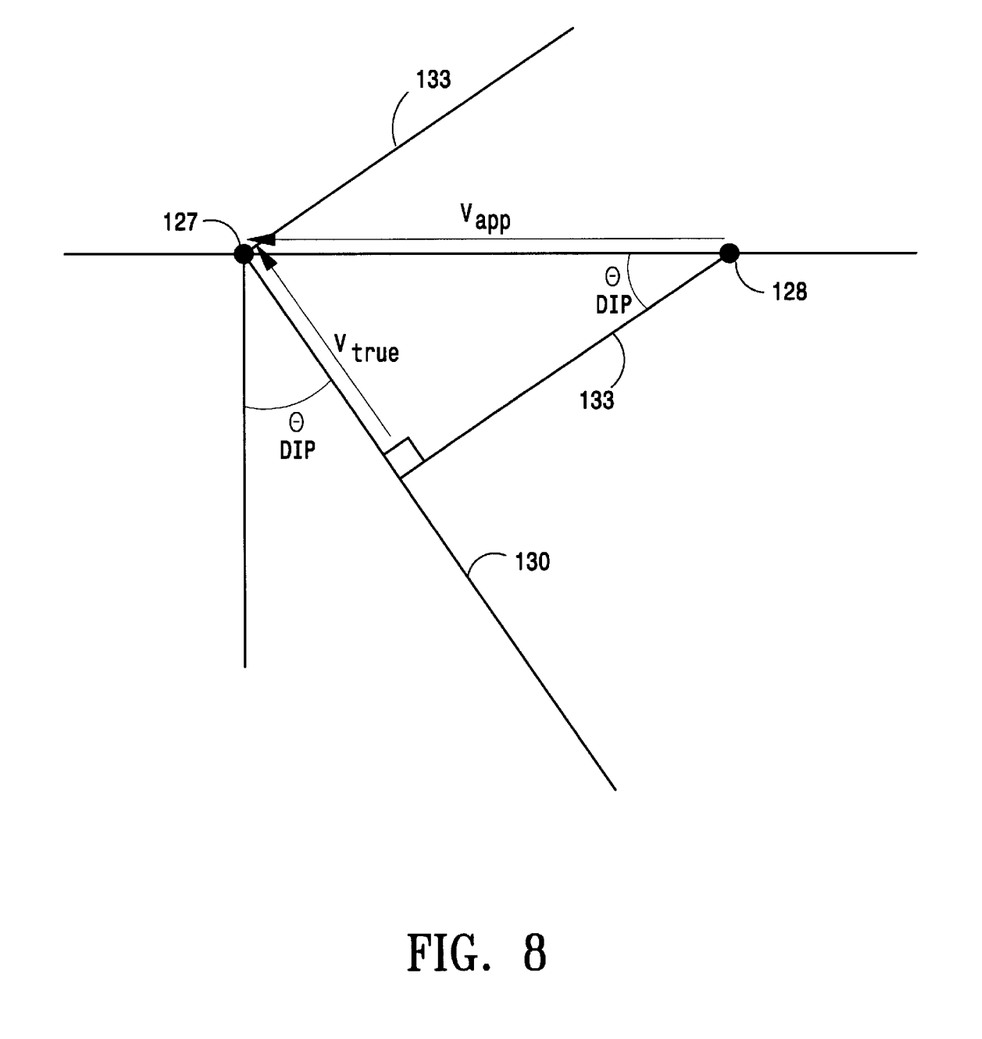
FIG. 8 shows the relationship between apparent wave velocity and true wave velocity.

Referring to FIG. 8, straight line 133 is perpendicular to dip line 130 and represents schematically the wavefront of waves 132 as they travel upward at the dip angle $\theta_{DIP}$. The wavefront 133 propagates up through the earth with a certain velocity referred to as the true velocity, $V_{true}$. The true velocity of seismic waves propagating through water is approximately 1500 meters per second (3325 miles per hour), and in general is considered to be a constant. True velocities can be easily determined using any one of a variety of known techniques.

Referring to FIG. 8, the horizontal component of the true velocity vector is referred to as the apparent velocity, $V_{app}$. The apparent velocity, $V_{app}$, is:

$$V app = V true / \sin(\theta_{DIP}). \quad (7)$$

Where "sin" is the trigonometric sine function. The apparent velocity has physical significance in that it is the horizontal velocity of the seismic wave 132 as detected by the receivers. As wavefront 133 moves upward, receiver 128 will detect the wavefront before receiver 127 detects it. Further, because of the distance between receivers 127 and 128 and the time interval between when the wavefront is detected by receiver 128 then receiver 127, the wavefront will appear to be traveling horizontally with velocity $V_{app}$.

As can be seen by equation (7), $V_{app}$ is inversely proportional to the sine of the dip angle $\theta_{DIP}$, given that $V_{true}$ is a constant. Thus, each straight line in the F-K plot of FIG. 6, the slope of which is $V_{app}$, defines a dip angle, $\theta_{DIP}$ in FIGS. 7 and 8. Moreover, data in the F-K plot of FIG. 6 along a straight line, such as line 195, represents only the seismic energy that propagated up through the earth at a particular dip angle, and excludes seismic energy propagating upwards at all other dip angles.

Referring now to FIGS. 3, 6, and 7, the seismic measurement and processing system 51 preferably corrects the data for source motion by selecting a constant time dip slice of data from the F-K domain in step 190 (FIG. 3). An exemplary constant time dip slice is shown in FIG. 6 as the portion of data 191 bounded by straight lines 194 and 196. Because lines 194 and 196 define a pie-shaped wedge in the F-K plot, the data contained between lines 194, 196 is referred to as a constant time dip slice or pie slice. By selecting a pie slice of F-K data and inverse F-K transforming the selected pie slice data in step 200, the seismic measurement and processing system 51 selects only the seismic energy that propagates upward through the earth within a range of dip angles defined by the slopes of lines 194 and 196. Thus, according to the preferred embodiment of the invention, a constant time dip slice of F-K data is selected in step 190 and inverse F-K transformed in step 200. The size of the pie slice can be set to whatever size is desired and is generally a function of the accuracy desired. The size of the pie slice thus relates to a range of dip angles, $\theta_{DIP} \pm \Delta\theta_{DIP}$.

The result of step 200 is a shot record that has been corrected for receiver motion and that represents the seismic energy that corresponding to a range of dip angles $\theta_{DIP} \pm \Delta\theta_{DIP}$ that are related as described above to the apparent velocity defined by the pie slice. It should be recognized that the seismic energy at dip angle $\theta_{DIP}$ includes a superposition of seismic waves that have reflected off millions of diffractors along line 130. Using principles grounded in classical Doppler theory, the data can be corrected for source motion.

To understand the application of Doppler theory, reference is made to FIG. 7 in which a source 112 moves from location $s_0$ at the beginning of the MVS frequency sweep to location $s_{end}$ at the end of the frequency sweep. Point diffractors 140, 142, 144 represent exemplary diffractor locations along line 130. Lines 145 and 146 represent the direction seismic waves travel from the initial source location $s_0$ and the ending source location $s_{end}$, respectively, to point diffractor 140. Similar lines can be drawn for seismic waves traveling to diffractors 142, 144. The seismic waves reflected by diffractors 140, 142, 144 travel upward along line 130 with dip angle $\theta_{DIP}$.

As shown, the source 112 moves from left to right and thus moves away from diffractor 140. Because the source moves away from the diffractor, the period of the emitted frequency sweep source signal will appear longer. Alternatively, the length of the frequency sweep will appear to be longer from the vantage point of diffractor 140. This change in frequency and length of the frequency sweep is referred to as frequency shift under Doppler theory. In this example, however, the source approaches diffractor 144 during the frequency sweep, and thus the frequency sweep becomes shorter from the vantage point of diffractor 144. Diffractor 142 is below the midpoint of the source's trajectory as it moves during the frequency sweep, and thus there is zero net frequency shift associated with diffractor 142. Moreover, the distortion due to source motion can be represented by the magnitude of the frequency shift using Doppler theory. As will be seen below, the magnitude of the Doppler shift can be computed for each diffractor location, or range of diffractor locations, and appropriate filters can be designed to correct the data for the distortion.

Figure 9:
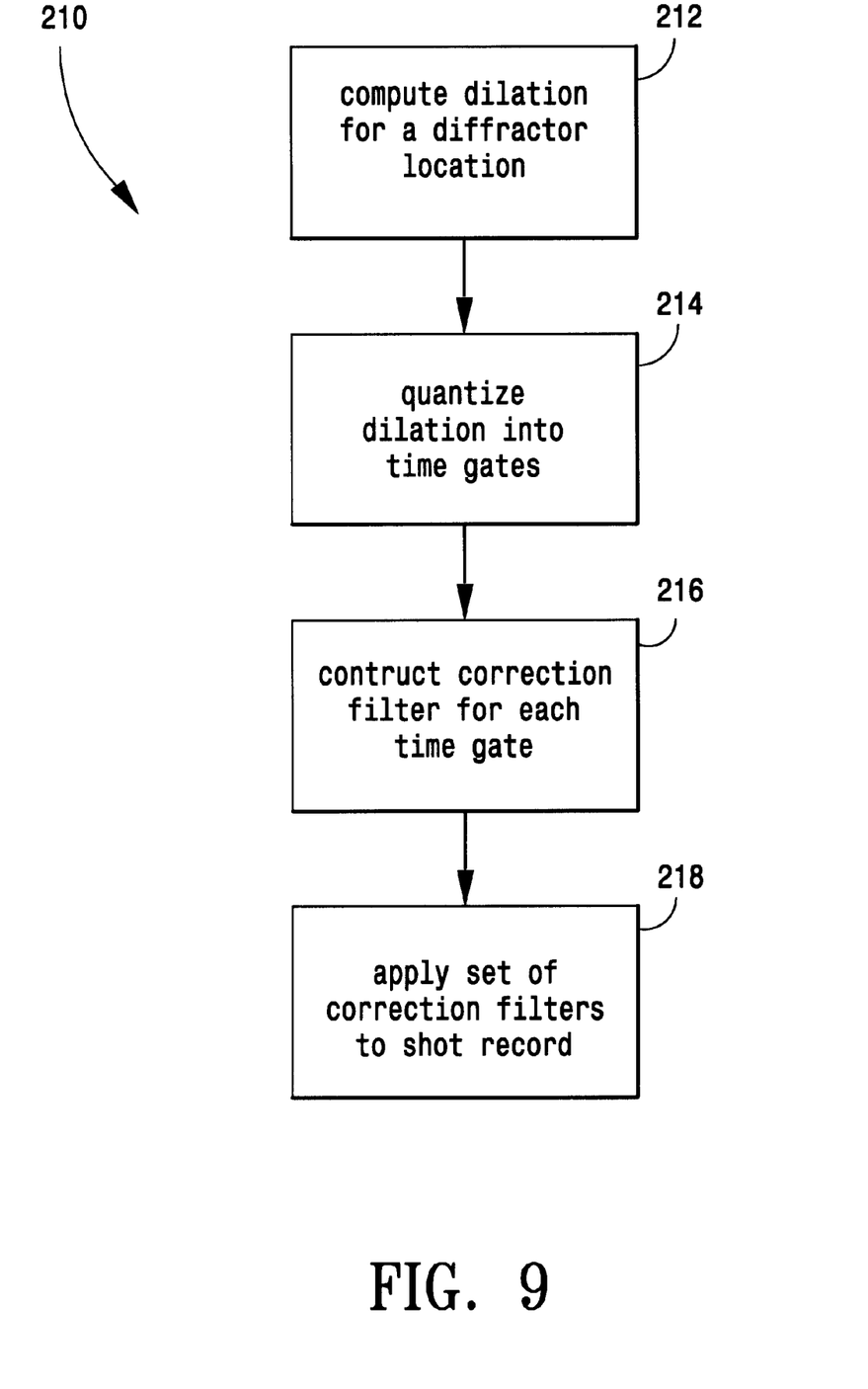
FIG. 9 shows the preferred method of constructing and applying Doppler shift filters to the shot records of FIG. 6.

Referring now to FIG. 9, the preferred steps 210 to compute and apply Doppler correction filters to correct for source motion includes first computing the magnitude of the distortion in step 212. Because the Doppler frequency shift alters the length of the frequency sweep at each diffractor location, the magnitude of the distortion due to source motion can be represented by computing the change in the length of the frequency sweep for each diffractor. The change in length in the frequency sweep, measured in units of milliseconds, is referred to as dilation (or compression) and thus, in step 212 the dilation is computed for each diffractor. The dilation varies with diffractor location and is thus divided into time gates in step 214 so that the seismic measurement and processing system 51 can provide a correction filter for each time gate in step 216. Finally, in step 218 the seismic measurement and processing system 51 applies the correction filters to the shot record to correct for the dilation.

Figure 10:
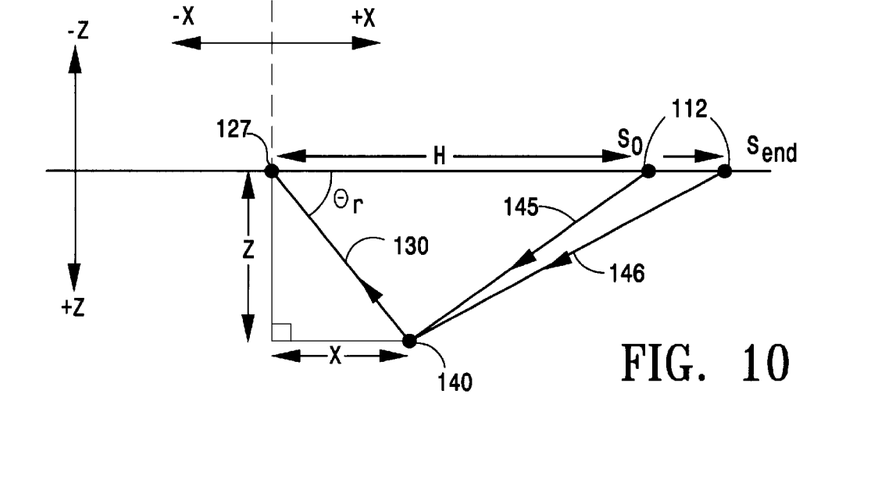
FIG. 10 shows the geometry associated with a moving source, a single point diffractor, and a receiver for calculating the amount of Doppler shift caused by the moving source.

Referring now to FIG. 10, the geometry associated with deriving the dilation for a diffractor 140 includes source 112 moving from an initial location $s_0$ at the beginning of a frequency sweep to an ending position $s_{end}$ at the end of a frequency sweep. Diffractor 140 is located at a depth Z below the stationary receiver 127 and distance X away from the receiver. The distance H represents the distance between the receiver and the source 112 at its initial position $s_0$. The angle $\theta_r$ is the angle from dip line 130 to the horizontal axis. Angle $\theta_r$ is related to the dip angle $\theta_{DIP}$ as $\theta_r = 90 - \theta_{DIP}$. Thus, once a constant pie slice of data is selected from the F-K domain, $\theta_r$ is defined. Seismic waves from the source at location $s_0$ travel along line 145 in the direction indicated, reflect off diffractor 140 and travel along line 130 to a receiver 127. Similarly, a seismic wave emitted by the source 112 at position $s_{end}$ travel along line 146 in the direction indicated, and reflect off diffractor 140 and also travel along line 130 to receiver 127. The amount of dilation is calculated as the difference between the time a seismic wave takes to travel from the source 112 at its initial position $s_0$ to receiver 127 and the time a wave takes to travel from the source to the receiver when the source is at its ending position $s_{end}$. Recognizing that the seismic waves take the same amount of time to travel along line 130 between the diffractor 140 and receiver 127 (or after correction for receiver motion), the dilation is simply the difference in time a wave takes to travel from the source 112 at location $s_0$ along line 145 to the diffractor 140, and the time of travel from the source at location $s_{end}$ to the diffractor along line 146. If $T_{s0}$ represents the former the time along line 145 and $T_{s\,end}$ represents the time along line 146, then the dilation is:

$$DIL = T_{s\,end} - T_{s0} \qquad (8)$$

where DIL is the amount of dilation. The dilation value DIL thus is positive when $T_{s\,end}$ is greater than $T_{s0}$ (i.e., when the source is moving away from the diffractor) and negative when $T_{s\,end}$ is less than $T_{s0}$ (source is moving toward the diffractor).

Referring still to FIG. 10, and applying the Pythagorean theorem:

$$VT = \sqrt{X^2 + Z^2} + \sqrt{(H-X)^2 + Z^2} \qquad (9)$$

and $$Z = X \tan(\theta_r) \qquad (10)$$

where V is the propagation velocity of seismic waves in water (1500 meters/second), T is the time a seismic wave takes to travel from the source at s0 along line 145 to diffractor 140 and along dip line 130 to receiver 127. Equation (9) can be rewritten as a quadratic equation and thus can be $$X = \frac{-B \pm \sqrt{B^2 - 4AC}}{2A} \quad (11)$$

solved for X:
where:

$$C = H^4 + V^4T^4 - 2H^2V^2T^2 \quad (12)$$

$$A = 4(H^2 - V^2T^2[1 + \tan^2(\theta_r)]) \quad (13)$$

$$B = 4H(V^2T^2 - H^2) \quad (14)$$

As shown in FIG. 10, the conventions are: horizontal distance away from the source to the receiver is +X; distance down from the source is +Z; and the dip angle, $\theta_r$, is measured from the negative x-axis in a clockwise direction. For $\theta_r$ less than or equal to 90°, the negative sign in equation (11) is used and for $\theta_r$ greater than 90°, the positive sign in equation (11) is used. Using equation (11), X can be calculated at time T, and once X is known, Z can be calculated using equation (10). Calculating X and Z for each constant $\theta_r$ provides the location of a diffractor for a seismic event at time T.

Equation (8) can be rewritten as:

$$DIL = \frac{\sqrt{(H + u_s T_{SL} - X)^2 + Z^2}}{V} - \frac{\sqrt{(H - X)^2 + Z^2}}{V} \quad (15)$$

where $u_s$ is the source velocity and $T_{SL}$ is the time length of the frequency sweep. As can be seen by examination of equations (11)–(15), the dilation DIL is a function of the location of a diffractor (X and Z), T, boat speed $u_s$, and the length of the frequency sweep $T_{SL}$. Further, equation (14) only has a solution when T>H/V.

Figure 11:
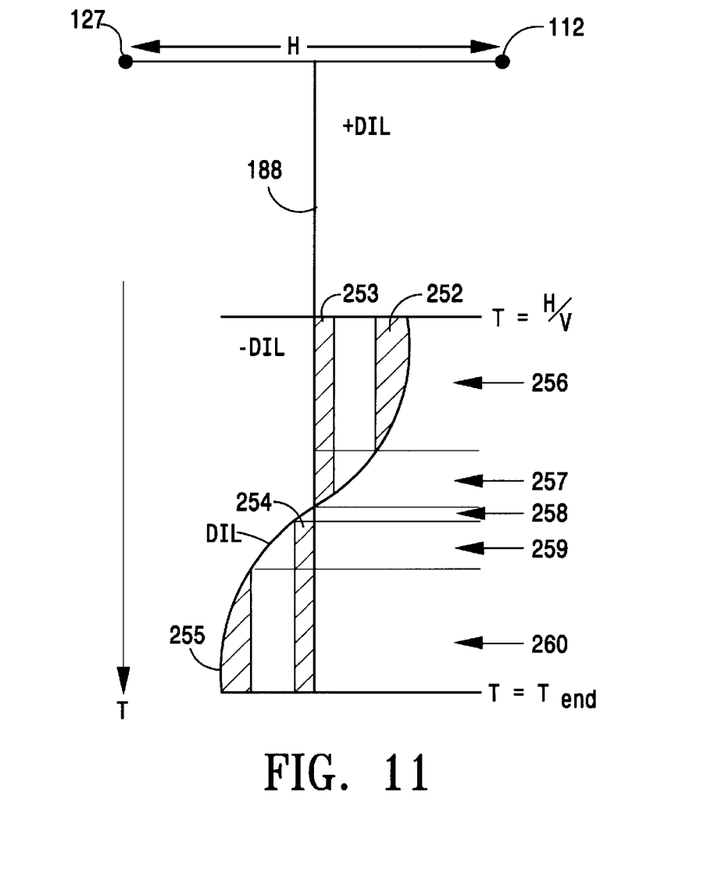
FIG. 11 shows the preferred method for computing Doppler shift corrective filters for multiple diffractors.

Referring now to FIGS. 9 and 11, a plot of dilation DIL as a function of time is shown for a source 112 and a receiver 127. As shown, positive DIL values are plotted to the right of axis 188 with negative DIL values to the left of the axis. Although, correction filters can be calculated on a sample-by-sample basis (which may be preferred), satisfactory results can be achieved in less time if the dilation curve is divided into segments and correction filters are constructed for each segment, rather than for the samples that comprise the segments. Thus, according to the preferred embodiment, dilation DIL is discretized into segments 252, 253, 254, 255 and associated time gates 256, 257, 258, 259, 260. The size of segments 252–255, and thus the size of time gates 256–260, can be set to any desired size.

Numerous techniques are available to construct appropriate filters to compensate the shot records for the amount of dilation in each time gate. For example, the sweep can be resampled to Δt' where $$\Delta t' = \frac{T_{SL}}{T_{SL} + DIL} \Delta t \quad (16)$$

where Δt is the sampling period for the shot record. After resampling, the new sample rate is overruled and called Δt providing a new shot record. As an exaggerated example, for a 1 second sweep dilated by 1 second and sampled at a 2 millisecond rate (one sample taken every 2 milliseconds), the sweep is resampled to 1 millisecond providing twice as many samples. The resampled data is then given a sample rate of 2 milliseconds making the record twice as long. The dilated sweep is then correlated with the non-dilated sweep. The phase of the result is the required phase correction.

The phase component of the data is non-zero due to the Doppler shifts which result from the ship's motion. Moreover, the major effect of the distortion due to source motion is seen only in the phase spectrum of the data. The distortion can be eliminated by forcing the phase component of the data to a constant value, preferably zero phase. Thus, in accordance with the preferred embodiment, the seismic measurement and processing system 51 extracts the phase component of the dilation model cross-correlated with the reference sweep. A standard all-pass inverse filter, such as can be obtained using the Wiener-Levinson technique, is selected to eliminate the phase content of the recorded data after correlation with the reference sweep signal. An all pass inverse filter does not alter the amplitude content of the data, rather only the phase content. The filter preferably is constructed to remove the phase content, causing the output signal from the filter to have zero phase. An all-pass inverse filter provides an exact solution.

Often, however, the phase error as a function of frequency can be approximated by a phase intercept angle and a phase slope term. Such an approximation to the phase error can be used to sufficiently eliminate the phase error. Additionally, other types of approximations, including higher order approximations, can be used as well. Such approximations permit a practical (i.e. less expensive) implementation than using an all-pass inverse filter.

The correction filters preferably are applied to the entire trace of data and then the appropriate segments from each corrected trace are selected and combined together to form a completely corrected data set. Thus, the correction for the data for a time gate of 1 second, for example, is applied to the data. Similarly, the corrections for time gates of 2 seconds, 3 seconds, 4 seconds, and so on, are also applied to the data set, thereby generating four data sets each corrected by a particular correction filter. Then, only the corrected data from 0 to 1.5 seconds is selected from the first data set, the corrected data from 1.5 to 2.5 seconds is selected from the second data set, the corrected data from 2.5 to 3.5 seconds is selected from the third data set, the corrected data from 3.5 to 4.5 seconds is selected from the fourth data set, and so on.

After correcting the seismic data for receiver and source motion for a constant dip slice in step 210 (FIG. 3), the next dip slice of F-K data is selected in step 240 and steps 200–210 are repeated until all of the F-K data has been selected. Once all the data has been corrected for each dip slice of F-K data, the results are summed in step 230 to produce the desired data corrected for source and receiver motion.

Numerous variations and modifications will become apparent to those skilled in the art once the above disclosure is fully appreciated. It is intended that the following claims be interpreted to embrace all such variations and modifications.

We claim:

1. A method for correcting seismic data for distortion caused by the motion of a seismic source and the motion of a seismic receiver, comprising:

(a) correcting the seismic data for motion of the receiver;

(b) correlating the receiver corrected seismic data from step (a) with a reference frequency sweep signal used by said seismic source to generate seismic waves;

(c) computing a forward F-K transform of the correlated data from step (b) to produce F-K transformed data;

(d) selecting a constant dip slice of said F-K transformed data;

(e) computing an inverse F-K transform of said constant dip slice of said F-K transformed data to produce inverse F-K transformed data; and (f) computing an appropriate correction filter for said inverse F-K transformed data.

2. The method of claim 1 wherein said step of selecting a constant dip slice of said F-K transformed data includes selecting F-K transformed data corresponding to a predetermined range of dip angles.

3. The method of claim 2 wherein said steps of selecting a constant dip slice of F-K transformed data (step (d)), computing an inverse F-K transform of said selected constant dip slice of data (step (e)), and computing an appropriate correction filter for said inverse F-K transformed data (step (f)) are repeated for additional constant dip slices of F-K data.

4. The method of claim 3 wherein said correction filter is applied to said seismic data to correct for said source motion.

5. The method of claim 4 wherein said step of computing an appropriate correction filter includes calculating at least one dilation value for said inverse F-K transformed data.

6. The method of claim 5 wherein said seismic data is generated by said source emitting seismic waves using said reference frequency sweep signal, and said dilation value is calculated by subtracting the time a seismic wave takes to travel from the source to the receiver at the end of the frequency sweep from the time a seismic wave takes to travel from the source to the receiver at the beginning of the frequency sweep.

7. The method of claim 6 wherein said inverse F-K transformed data includes seismic data reflected off of a plurality of diffractors located along lines corresponding to said predetermined range of dip angles and a plurality of dilation values are calculated for said seismic data.

8. The method of claim 7 wherein said dilation values are discretized into segments.

9. The method of claim 8 wherein said step of computing an appropriate correction filter includes resampling said seismic data to a sampling period that is different than the sampling period used to initially sample said seismic data.

10. The method of claim 9 wherein said step of computing an appropriate correction filter also includes computing a plurality of all pass inverse filters, each all pass inverse filter corresponding to a particular segment of said dilation values.

11. The method of claim 10 wherein the results of applying said correction filters to said seismic data are added together.

12. A method for correcting marine seismic data for distortion caused by the motion of a seismic source, comprising:
    separating said seismic data into portions, each portion corresponding to a range of dip angles, wherein said step of separating said seismic data into portions includes:
        computing a transform of said seismic data to produce transformed data;
        selecting a subset of said transformed data; and
        computing an inverse transform of said subset;
    computing Doppler correction filters for said portions; and
    applying said Doppler correction filters to said portions.

13. The method of claim 12 wherein said step of computing a transform includes computing an F-K transform and said step of computing an inverse transform includes computing an inverse F-K transform.

14. The method of claim 13 wherein said step of computing a transform includes computing a τ-p transform and said step of computing an inverse transform includes computing an inverse τ-p transform.

15. The method of claim 14 wherein said step of computing a transform includes computing a Laplace transform and said step of computing an inverse transform includes computing an inverse Laplace transform.

16. The method of claim 15 wherein said Doppler correction filters include all pass inverse filters.

17. A seismic system, comprising:
    a seismic measurement and processing system;
    a user input device coupled to said seismic measurement and processing system;
    a display device coupled to said seismic measurement and processing system;
    wherein said seismic measurement and processing system includes a processing unit and a storage unit, and said seismic measurement and processing system corrects seismic data for source motion by computing an F-K transform of said seismic data, computing an inverse F-K transform of a constant dip slice of said F-K transformed data, and applying appropriate correction filters to each inverse-transformed constant dip slice of F-K transformed data.

18. The seismic system of claim 17 wherein said seismic measurement and processing system selects a constant dip slice of said F-K transformed data corresponding to a predetermined range of dip angles.

19. The seismic system of claim 18 wherein said seismic measurement and processing system selects multiple pie slices of F-K transformed data, computes a set of appropriate correction filters for each selected constant dip slice of data, applies said set of appropriate correction filters to said seismic data detected by said receiver, and adds together the seismic data after being filtered by said set of correction filters.

20. A seismic system, comprising:
    a seismic measurement and processing system;
    at least one seismic source coupled to said seismic measurement and processing system;
    at least one seismic receiver coupled to said seismic measurement and processing system;
    a user input device coupled to said seismic measurement and processing system; and
    a display device coupled to said seismic measurement and processing system;
    wherein said seismic measurement and processing system includes a source and receiver interface unit, a processing unit, and a storage unit, and said seismic measurement and processing system corrects for source motion by computing an F-K transform of seismic data detected by said receivers, computing an inverse F-K transform of a constant dip slice of said F-K transformed data, and applying appropriate correction filters to each inverse-transformed constant dip slice of F-K transformed data.

21. The seismic system of claim 20 wherein said seismic measurement and processing system selects a constant dip slice of said F-K transformed data corresponding to a predetermined range of dip angles.

22. The seismic system of claim 21 wherein said seismic measurement and processing system selects multiple constant dip slices of F-K transformed data, computes a set of appropriate correction filters for each selected constant dip slice of data, applies said set of appropriate correction filters to said seismic data detected by said receiver, and adds together the seismic data after being filtered by said set of correction filters.

* * * * *